Oct. 25, 1955   N. LANGER   2,721,925
HEAT SEALING MACHINE
Original Filed Feb. 27, 1951   2 Sheets-Sheet 1
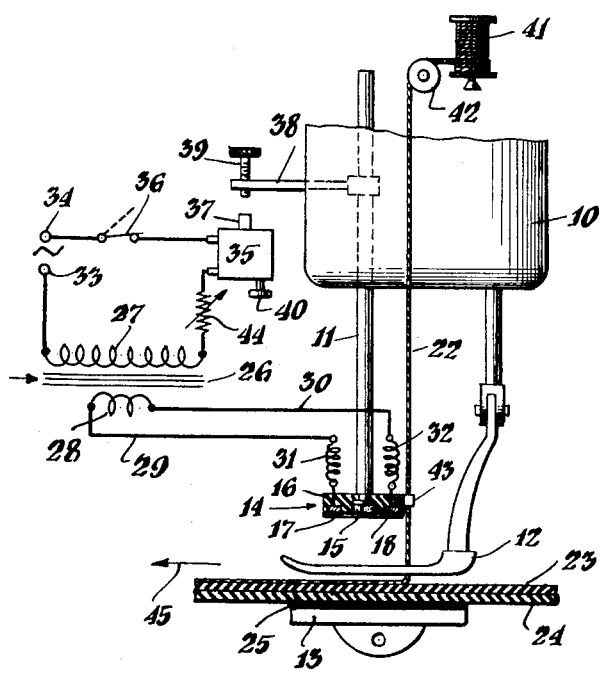
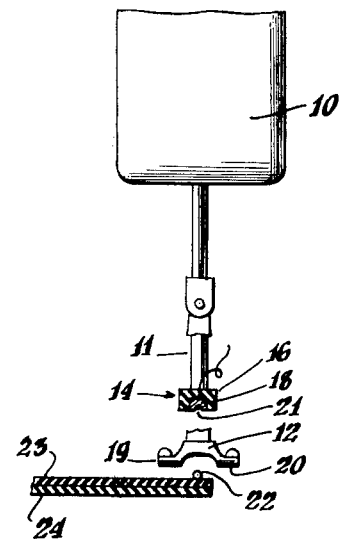
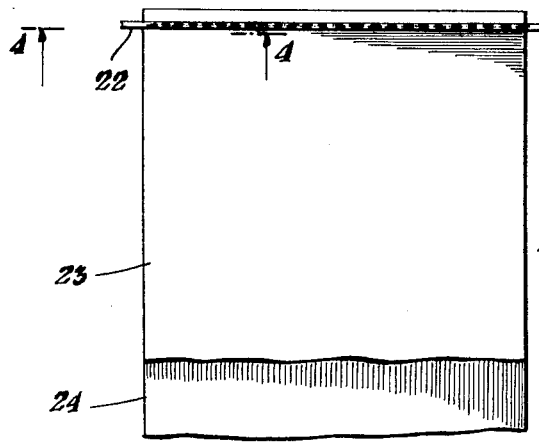
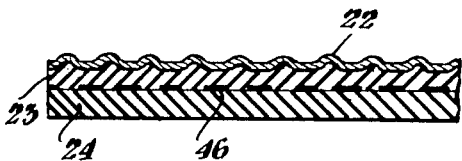
INVENTOR.
Nicholas Langer Oct. 25, 1955
N. LANGER
2,721,925
HEAT SEALING MACHINE
Original Filed Feb. 27, 1951
2 Sheets-Sheet 2
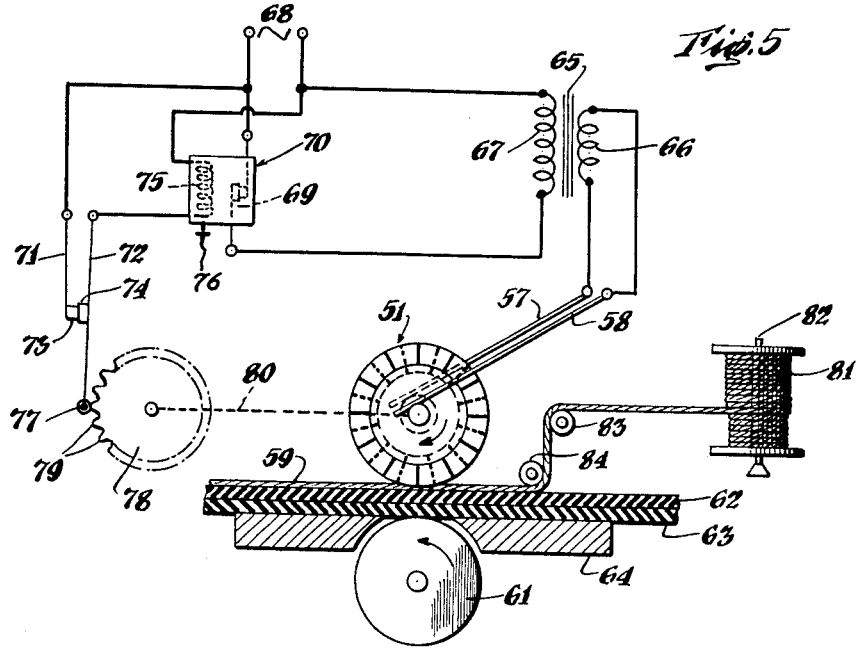
Fig. 5
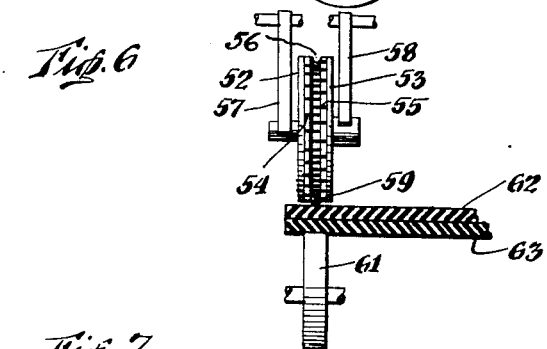
Fig. 6
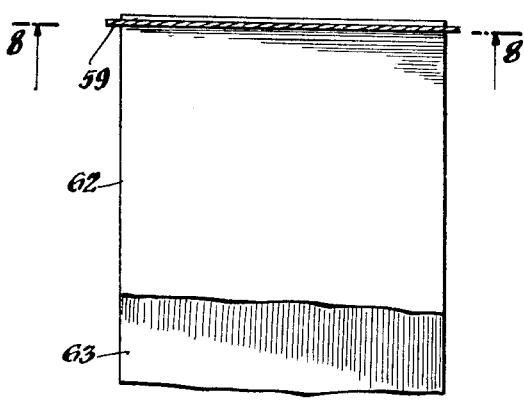
Fig. 7
Fig. 8
INVENTOR.
Nicholas Langer United States Patent Office 2,721,925
Patented Oct. 25, 1955

2,721,925

HEAT SEALING MACHINE

Nicholas Langer, New York, N. Y.

Original application February 27, 1951, Serial No. 212,880, now Patent No. 2,640,798, dated June 2, 1953. Divided and this application March 26, 1953, Serial No. 344,807

6 Claims. (Cl. 219—19)

This invention relates to machines for bonding or sealing together a plurality of plies or layers of thermoplastic sheet material.

The present application is a division of my co-pending application Serial No. 212,880, filed February 27, 1951, now Patent No. 2,640,798, granted June 2, 1953.

In recent years various bonding machines have been introduced for bonding together plies of thermoplastic material by electrostatic heating of the material in a high frequency field. The operation of these machines is based on passing the superposed plies of the thermoplastic material through the space between a pair of electrodes connected to a source of radio frequency energy, the displacement of such plies being effected in a step-by-step or discontinuous manner, such as in a conventional sewing machine, or in a continuous manner, such as by means of a pair of feed rolls. The powerful high frequency field produced in the electrode zone will heat up the plies of the material passing therethrough to their bonding temperature, causing sealing or bonding of such plies as a result of the joint effect of heat and electrode pressure.

While electrostatic bonding machines of the described character, sometimes referred to in the industry as "electronic sewing machines," have been used in the industry for some years on a rather limited scale, their use on a large scale in the quantity production of articles formed from thermoplastic sheet material was greatly handicapped and in many cases was completely prevented by a combination of the following factors:

(1) The operation of conventional electronic sewing machines is based on the heat produced in the material as a result of dielectric losses in a high frequency field. This introduces certain inherent limitations as to the types of thermoplastic materials which may be successfully bonded and obviously excludes such materials in which the dielectric losses are very low. It so happens, that there are various materials, such as particularly polyethylene, which are characterized by an extremely low loss factor, although they are quite desirable for other reasons, such as low cost, high strength, chemical inertness, low gas permeability, and the like.

(2) In view of the extremely high frequencies used in electrostatic bonding machines, serious problems are introduced in connection with impedance matching, in controlling the amount of heat generated in the plies, etc. Even very minute and frequently unavoidable variations in the composition and thickness of the plies or in the rate feeding the plies past the electrodes may prevent the production of uniformly sound seals or bonds.

(3) The amount of high frequency energy required is quite considerable and the equipment necessary for generating such energy is bulky and expensive both to build and to operate. As a result, the initial cost of these electrostatic bonding machines is quite high and their commercial use is profitable only in extreme cases where no other method of bonding will serve.

I have discovered that the outstanding problem may be solved and the foregoing disadvantages may be eliminated in a remarkably simple manner.

It is an object of the present invention to improve electronic bonding machines.

It is another object of the present invention to provide a novel and improved electronic bonding machine of the thermal impulse type.

It is a further object of the present invention to provide a novel machine for bonding together plies of thermoplastic sheet material in which an electrically conducting thread or filament is combined with linear regions of the plies by passing heating pulses of current through limited lengths of such filament.

It is also within the contemplation of the invention to provide an electronic bonding machine which does not require any high frequency currents for its operation but may be operated with alternating currents of commercial power line frequencies.

The invention also contemplates an electronic bonding machine which is simple and inexpensive to construct and to operate and which may be manufactured and sold at a fraction of the cost of conventional electronic bonding machines of the high frequency electrostatic type.

Other and further objects and advantages of the invention will become apparent from the following description, taken in conjunction with the accompanying drawing; in which Fig. 1 is a side elevation, somewhat diagrammatic and fragmentary in character, of an electronic bonding machine embodying the principles of the invention;

Fig. 2 is a front view of a portion of the machine shown in Fig. 1;

Fig. 3 is a fragmentary top plan view of two layers of thermoplastic sheet material bonded together in accordance with my present invention;

Fig. 4 is a section taken on line 4—4 of Figure 3;

Fig. 5 is a view similar to Figure 1 but showing a modified form of my invention.

Fig. 6 is a front elevation of the apparatus shown in Figure 5;

Fig. 7 is a fragmentary top plan view of two layers of thermoplastic sheet material bonded together by means of the apparatus shown in Figures 5 and 6; and Fig. 8 is a section taken on line 8—8 of Figure 7.

Broadly considered, in accordance with the principles of my invention, the layers or plies of thermoplastic sheet material to be bonded together are brought into face-to-face superposed position and into contact with an electrically conducting elongated member, such as a thin strip, band, thread, or filament. The structure constituted by said layers and said filament is then passed through a pressure zone wherein a limited length of the structure is placed under compression and at the same time a pulse of an electric current is passed through the corresponding length of the filament. This pulse of current will heat the said lengths of the filament and the region of the thermoplastic layers in contact therewith to heat sealing temperature, practically instantaneously. The combined effect of heat and pressure in the pressure zone will cause heat sealing or bonding of the layers, at the same time partially or fully embedding the filament in the bonded region, thereby producing a "stitch." Further portions or lengths of the thermoplastic layers with the superposed conducting filament are advanced into the pressure or bonding zone in a continuous or discontinuous manner and the procedure is repeated to progressively form a series of closely spaced or even continuously merging "stitches" in the layers. Advantageously, in each sealing or bonding cycle, the duration of the pulse of sealing current is so controlled as to be shorter than that of the application of pressure so that each "stitch" may be permitted to cool and to consolidate while still under pressure. In this manner, the maximum strength of the produced bond is obtained, as will be set forth more fully hereinafter.

Referring now more particularly to Figs. 1 and 2 of the drawing, reference numeral 10 denotes the head of a suitable reciprocating mechanism, such as the one found in conventional sewing machines. This mechanism actuates a reciprocating bar 11 and a pressure foot 12 in predetermined sequence, the said pressure foot cooperating with a feed dog 13 to advance the layers of thermoplastic material interposed therebetween. In view of the fact that the reciprocating mechanism and bar and the pressure foot and feed dog are conventional in structure and their operation is well known to those skilled in the art, no detailed description thereof will be necessary, particularly as they do not form part of the present invention.

At the lower end of reciprocating bar 11, there is secured a sealing member or bar, generally denoted by reference numeral 14, by means of a screw 15. Sealing member 14 is in the form of a narrow elongated piece 16 of insulating material of great mechanical strength, such as a suitable synthetic resin. A pair of metallic electrodes 17 and 18 are molded or embedded in piece 16 of insulating material so that their smooth lower surface is flush with that of the insulating material and constitutes the pressure surface of the sealing member or bar. It will be noted that the width of the sealing member is less than the space between the two arms 19 and 20 of pressure foot 12 so that the said member may be reciprocated between the two arms during operation of the machine, much in the same way as the needle of a conventional sewing machine. A shallow, semi-circular longitudinal groove 21 extends along the length of the pressure face of the sealing member, including the exposed surfaces of electrodes 17 and 18 and serves for guiding an electrically conducting thread or filament 22 in the proper cooperating relation with layers 23 and 24 of thermoplastic sheet material.

The top or operating surface of feed dog 13 is covered with a layer 25 of a suitable elastomer, such as of silicone rubber, constituting a pressure member, the working face of which is arranged for cooperation with the working face of the sealing member 14 and as a result of its surface characteristics is adapted for frictional engagement with layer 24 of the thermoplastic sheet material.

The electrical system of the machine comprises a stepdown transformer 26, having a primary, or high-voltage winding 27 and a secondary or low-voltage winding 28. The ends of secondary winding 28 are respectively connected to electrodes 17 and 18 through lead wires 29 and 30 and through resilient spiral conductors 31 and 32 so that such electrical connection is maintained during the reciprocation of sealing member 14.

The primary winding 27 of transformer 26 has one of its ends directly connected to terminal 33 and its other end is connected to terminal 34 of a source of alternating current of commercial power line frequency through a time-delay switch 35, rheostat 44, and an on-off switch 36. Actuating plunger 37 of time-delay switch 35 is operable by means of an actuating rod 38, mounted on the upper portion of reciprocating bar 11. The time when operation of the time-delay switch 35 is initiated during downward displacement of reciprocating bar 11 is adjustable by means of set screw 39 depending from the end of actuating rod 38 and the length of the period after which the said switch is automatically disabled or opened is adjustable by means of screw 40. In view of the fact that time delay switches of various types adaptable to the purposes of the present invention are well-known to those skilled in the art, the said switch has been merely diagrammatically indicated in the drawing. For a detailed description of such switches reference may be had, for example to my Patents 2,460,460 and 2,479,375.

The electrically conducting thread or filament 22 is drawn from a spool 41 over a guide roll 42 and through an apertured guide member 43 mounted on the side of sealing member 14. Great variations are possible in the material of the thread or filament. It may be in the form of a thin, highly flexible metal wire having appreciable strength, such as copper, aluminum, steel or iron wire, and the like. In general, wires formed of metals or alloys of high specific resistivity are preferred for reasons which will appear presently, thus, thin wires formed of high resistance alloys, such as a nickel-chromium alloy known in the trade as "Nichrome" are excellent both from the point of view of high resistivity and high tensile strength but are relatively expensive. A good compromise may be found in using iron or steel wire, such as an iron or steel wire coated or plated with copper, nickel, tin or zinc, which is inexpensive but combines relatively high resistivity with satisfactory tensile strength and good surface characteristics.

Other materials suitable for the purposes of the invention are synthetic filaments of an electrically conducting character, such as filaments extruded from cellulose derivatives, rubber hydrochloride, vinyl resins, vinylidene chloride, polyethylene. These materials, which are normally good dielectrics, are rendered electrically conducting by the incorporation of substantial proportions of carbon or graphite particles, or of a suitable finely divided metal powder. Particularly good results are obtained when the electrically conducting synthetic filaments are made of a material having approximately the same melting or softening temperature as the thermoplastic sheet materials to be bonded together. For example, sheets of polyethylene may be advantageously bonded by means of filaments extruded from a mass of polyethylene, which was rendered electrically conducting by the admixture of finely divided carbon, graphite, or metal particles.

A satisfactory and very inexpensive electrically conducting filament is provided by a conventional sewing thread of textile fibres which is impregnated or coated with carbonaceous material. While threads of this type are not readily obtainable in commerce at the present time, they are easily produced, for example by passing a conventional sewing thread through a colloidal graphite solution, such as the colloidal graphite preparation known under the name "Aquadag," or by impregnating or coating the thread with such preparations in some other suitable manner.

From the foregoing description, the operation of the bonding machine of the invention will be readily understood by those skilled in the art.

When beginning the bonding operation, the layers 23 and 24 of thermoplastic sheet material to be bonded together are placed in face-to-face position on surface 25 of the machine and pressure foot 12 is manually set into its operative position, holding the said layers against surface 25. The end of electrically conducting filament 22 is now placed in and along the groove 21 of sealing member or bar 14. The reciprocating bar 11 and sealing bar 14 with the end of filament 22 underneath will be passed through arms 19 and 20 of the pressure foot and pressed against the surface of layers 23 and 24. It will be noted that in this position of the several elements, electrodes 17 and 18 of the sealing member will be pressed into electrical contact with the interposed unit length of the conducting filament. During the downward displacement of reciprocating bar 11, screw 39 will depress actuating plunger 37 of time-delay switch 35. This, however, will not result in energizing transformer 26 due to the fact that main line switch 36 is still open. Switch 36 is now closed so that the primary winding 27 of transformer 26 is energized from alternating current source 33, 34, main switch 36, rheostat 44, and preset time delay switch 35. The time delay switch is so constructed and arranged as to maintain the circuit closed only for a predetermined short period of time, generally in the order of a fraction of a second, and thereafter to automatically open the said circuit. During the period while the circuit is closed, a low voltage pulse of alternating current of relatively high intensity will be produced in the secondary circuit, comprising secondary winding 28, conductors 29, 30, 31 and 32, electrodes 17 and 18 and the interposed unit length of conducting filament 22. The extremely short but powerful pulse of current will practically instantaneously heat the said length of filament to or even considerably above the heat sealing or bonding temperature of layers 23 and 24. The heat thus generated is transferred by surface contact to the underlying region of the said layers causing heat sealing thereof. As a result, the unit length of the conducting filament will be embedded into one or both of the underlying layers and upon cooling will form a strong bond therewith. In the following such unit length of the conducting filament bonded to two layers of thermoplastic film will be referred to as a "stitch."

As a result of the manually executed preparatory steps described in the foregoing, the end of the conducting filament has been securely bonded to the first stitch or bond formed in the thermoplastic layers. Thus, when the said layers are now displaced in the direction of arrow 45 by the length of the "stitch" due to the conventional cooperation of pressure foot 12 and feed dog 13, a further unit length of the said conducting filament will be pulled from spool 41, through guide roller 42 and guide member 43.

The bonding machine is now ready for the automatic operation, by actuating the driving means including an electric motor and the various mechanical devices driven thereby whereby reciprocating bar 11, pressure foot 12 and feed dog 13 are operated in properly timed sequence in a manner similar to the operation of a conventional power-driven sewing machine. During this automatic operation, the following steps are carried out cyclically and in very rapid succession:

(1) Pressure foot 12 is lowered to hold down layers 23 and 24 against surface 25 of feed dog 13.

(2) Reciprocating bar 11 is lowered, thereby pressing the pressure member 14 and the underlying unit length of conducting filament 22 against the portion of the upper thermoplastic layer 23 exposed between the arms 19 and 20 of pressure foot 12. In this position, the ends of said unit length of the conducting filament 22 are in electrical contact with electrodes 17 and 18 of pressure member 14.

(3) Shortly before or immediately after the pressure member 14 has reached its pressure-applying position, set screw 39 will be displaced downwardly by means of actuating rod 38, concurrently with the downward displacement of reciprocating rod 11 and the said set screw will strike against actuating plunger 37 of time delay switch 35.

(4) Operation of the time delay switch 35 is initiated, the said switch being of the type which closes an electric circuit at once and opens the said current automatically, after a predetermined and adjustable time delay period.

(5) The primary circuit, including terminal 34 of the alternating current power line, main switch 36, time delay switch 35, rheostat 44, primary winding 27, and terminal 33 of the power line, is now energized. This will induce a low-voltage high-intensity current in the secondary circuit comprising secondary winding 28, conductors 29, 30, 31, 32, electrodes 17 and 18, and the unit length of conductive filament 22 between said electrodes.

(6) The heavy current flowing through the unit length of filament will heat the said length to a relatively high temperature, such temperature being reached practically instantaneously due to the low heat capacity of the filament. The heat thus produced is rapidly conducted by surface contact and conduction into the corresponding region of the underlying thermoplastic layers 23 and 24. As a result of the combined effect of heat and pressure, a "stitch" is formed in the said region, in which "stitch" the unit length of the filament and the underlying regions of the layers are bonded together.

(7) Immediately upon the said "stitch" being completed, the time delay switch 35 will automatically open the primary circuit and thus also deenergize the secondary circuit. However, the pressure of member 14 on the "stitch" is maintained for a short predetermined period thereafter, in order to permit the "stitch" to cool and to consolidate under pressure, thereby developing maximum strength therein.

(8) Reciprocating rod 11 is now raised, lifting up sealing member 14 from the completed "stitch."

(9) Feed dog 13 is actuated, its operative surface 25 engaging with some friction the lower face of thermoplastic layer 24, thereby advancing a new length of layers 23 and 24 and of filament 22 into "stitch"-forming position, whereupon the entire cycle is repeated over and over again so long as the machine is maintained in operation and is supplied with films of thermoplastic material and conducting thread.

Figs. 3 and 4 show the thermoplastic layers 23 and 24 bonded together by the machine and forming a unitary product with the electrically conducting thread 22. It will be noted that the external appearance of the bonded product is not unlike that of a pair of layers stitched together by means of a conventional sewing machine. However, the actual bond between the layers is formed by fusion of the layers in the line 46 and not by the locking effect of the thread itself. As a matter of fact, in some cases, the electrically conducting thread may be separated from or may be peeled off from the finished bonded product.

While in Fig. 4 the line of fusion bond 46 is shown as a succession of spaced "stitches," such unit lengths of fusion bond may be caused to merge into each other by appropriate control of the bonding cycle, particularly by making the unit length by which the materials are advanced after each "stitch" less than the length that is bonded together during each bonding cycle. This will cause the successive "stitches" to overlap and to merge into each other.

The bonding machine of the invention just described operates in a cyclic or reciprocating manner, that is, the materials to be bonded are advanced through the bonding station step-by-step. In some cases, however, it is advantageous to carry out the bonding process upon a continuously displaced material, such mode of operation being adaptable to higher operating speeds. A bonding machine suitable for this mode of operation will now be described with reference to Figs. 5 and 6 of the drawing.

The most important element of this modified embodiment of the invention is a bonding wheel or roll, generally denoted by reference numeral 51. As it will best appear from Fig. 6, this wheel comprises a pair of metal discs 52 and 53, each having pluralities of integrally formed teeth, 54 and 55, respectively, uniformly spaced around the circumference thereof, such teeth alternately extending into their respective interspaces. The interspaces are filled with heat-resistant insulating material and the entire structure is turned down smooth in a lathe to produce a smooth circumferential face in which tooth-like metal segments or electrodes are embedded, such segments being alternately connected electrically with discs 52 and 53 respectively. It is preferred to machine a small depression or groove 56 into the circumferential face of the bonding wheel for positively guiding an electrically conducting filament or thread 59 therein. Brushes 57 and 58 are arranged in sliding contact with metal discs 52 and 53, respectively, or with suitable slipring-like extensions thereof. It will thus be noted that each of the said brushes is in continuous electrical contact with one half of the metal segments or electrodes 54, 55, on the circumference of the bonding wheel, the segments of the two groups alternating with each other.

Bonding wheel or roll 51 cooperates with a pressure wheel or roll 61, a suitable conventional driving mechanism (not shown) being provided for driving the wheels or rolls in opposite directions, thereby continuously advancing layers 62 and 63 of thermoplastic film, with the electrically conducting thread 59 superposed thereon, on feed table 64 through the bight of the wheels or rolls.

The electrical circuit of the bonding machine comprises a step-down transformer 65 having a secondary or low-voltage winding 66, the ends of which are respectively connected with brushes 57 and 58. One end of the primary winding 67 of said transformer is directly connected to one terminal of a source of alternating current 68 of power line frequency, while the other end of the primary winding is connected to the other terminal of said source through operating contacts 69 of a time delay relay generally denoted by reference numeral 70.

The control circuit of the machine comprises a pair of leaf or contact springs 71 and 72, respectively carrying cooperating contacts 73 and 74. Contact spring 71 is directly connected to one of the terminals of alternating current source 68, while contact spring 72 is connected to the other terminal of said source through the actuating electromagnet 75 of the time delay relay 70. The time delay relay is one of the well-known conventional type being so constructed and arranged that upon energizing electromagnet 75 for a short period, contacts 69 are closed and such contacts are reopened automatically after a predetermined time delay period and the relay is reset for the next operating cycle. The length of the time delay period may be manually adjusted by adjustment screw or knob 76.

Leaf spring 72 is extended further than spring 71 and carries at its free end a small roller 77 which rides on the circumference of a cam disc 78 having uniformly spaced protuberances, or teeth 79 thereon. Cam disc 78 is mechanically connected to bonding wheel 51 for joint rotation therewith through a shaft or similar mechanical connection diagrammatically indicated by dotted line 80. The number of protuberances or teeth on cam disc 78 equals in number the combined number of segments 54 and 55 on bonding wheel 51 and their angular arrangement is so adjusted with respect to that of the said segments that cam follower roller 77 is lifted up upon or shortly after a pair of adjoining segments in groups 54 and 55 are being pressed against and brought into electrical contact with a unit length of the electrically conducting thread 59.

The electrically conducting thread 59 is unwound from a supply roll or bobbin 81, rotatably supported on a spindle 82, and is guided around guide rolls 83 and 84 to groove 56 of bonding wheel 51 and into cooperating bonding relation with layers of thermoplastic material 62 and 63.

The operation of this modified embodiment of the invention is as follows:

Layers 62 and 63 of the thermoplastic material, with the free end of the electrically conducting thread 59 superposed thereon, are placed on feed table 64 between bonding wheel 51 and pressure wheel 61, the said thread being placed into circumferential groove 56 of the bonding wheel. The driving means are then actuated causing continuous rotation of wheels 51 and 61 in opposite directions and continuous advancement of the thermoplastic layers and superposed thread. Cam disc 78 will also be rotated in the same direction and at the same angular velocity as bonding wheel 51. The following cycle or sequence of operations will now take place:

(1) A pair of adjacent contact segments from groups 54 and 55, respectively, will be pressed against a unit length of thread 59 that happens to be in the bight of wheels 51, 61, thus electrically connecting such unit length to the ends of secondary winding 66 of transformer 65 through brushes 57 and 58, which slide on the slip rings integrally formed with metal discs 52 and 53, respectively.

(2) Approximately at the same time, roller 77 will be lifted up by one of the protuberances 79 of cam disc 78, closing the control circuit of the machine between contacts 73 and 74, thus completing the circuit of electromagnet 75. Upon being energized, the electromagnet initiates the operation of time delay relay 70. The relay closes its operating contacts 69 which connect the primary winding 67 of transformer 65 directly to alternating current source 68.

(3) A pulse of low-voltage alternating current of high intensity is induced in secondary winding 66 and is caused to flow in the secondary circuit including winding 66, brushes 57, 58, contact segments 54, 55 and the unit length of electrically conducting thread 59 under compression. The heat generated in the said unit length is transferred by surface contact to the underlying linear region of thermoplastic layers 62 and 63, causing fusion and bonding or heatsealing thereof at their interface.

(4) A predetermined but extremely short period thereafter, the time delay relay automatically breaks the primary circuit between contacts 69, discontinuing the generation of sealing heat in the bonding zone. Preferably, the period of heat generation is so adjusted as to be somewhat shorter than the period of pressure application thereby allowing the bond or "stitch" formed to cool and set under pressure.

(5) A new unit length of the thermoplastic layers 62, 63 and of thread 59 is advanced into the bonding zone and the cycle is repeated.

Of course, the entire cycle takes place within a small fraction of a second so that relatively high linear bonding speeds may be obtained.

In some cases, particularly when high operating speeds are used, the proper coordination of the period during which transformer 65 is energized to the period of pressure application may be accomplished merely by giving a suitable shape to teeth or protuberances 79 of cam disc 78. In that case relay 70 may be simply an ordinary switching relay, rather than a time delay relay.

Figs. 7 and 8 illustrate the appearance of the bonded product of the bonding machine shown in Figs. 5 and 6. It will be noted that the product comprises a pair of layers 62 and 63 of thermoplastic material which are fused together in their interface along a linear region 85, the electrically conducting thread 59 being partially or fully embedded into one or both of the said layers. While the heatsealing operation is carried out progressively for unit lengths of materials, the resulting "stitches" or elementary bonds are so closely spaced or are even overlapping with respect to each other that they result in a linear bond which is for all practical purposes continuous and fluid-tight. In some cases when the electrically conducting thread 59 is of sufficient tensile strength and its diameter is substantial as compared to the combined thicknesses of the thermoplastic layers 62, 63, the thread is capable of functioning as a "tearing strip." In other words the removal or stripping off of the thread from the bonded article, which may, for example, be a sealed bag, will cause opening of the sealed bond or at least considerable weakening thereof. Where such operation of the thread is intended, it is desirable to leave a length of the thread freely extending beyond the bonded layers, such length being adapted to be gripped by the fingers for carrying out the tearing or stripping operation. Otherwise, of course, the said thread is cut off approximately at the point where the thermoplastic layers end, after completion of the bonding operation, much in the same way as the thread is cut or broken off after two pieces of fabric or other sheet material have been stitched together by means of a conventional sewing machine.

While the machines and methods of the invention have been described and illustrated with particular reference to bonding together two layers or plies of thermoplastic material, they are obviously applicable with equal or similar results to the bonding of three or more plies of such materials.

What is claimed is:

1. A machine for heat sealing layers of thermoplastic material comprising, in combination, a pair of cooperating pressure members, means for progressively feeding the layers to be heat sealed together with a superposed electrically conducting filament which is unattached to said pressure members and is of a length substantially equal to that of said layers into the space between said members, a pair of electrodes for interposing a length of said filament into an electric circuit thereby to heat such length and the region of said layers in contact therewith to heat sealing temperatures substantially coincidentally with the application of pressure to such region, and an actuating mechanism for said feeding means to progressively advance further lengths of said layers and of said filament into cooperating relation with said pressure members and with said electrodes.

2. A machine for heat sealing layers of thermoplastic material comprising, in combination, a pair of cooperating pressure members, means for reciprocating said members, means for progressively feeding the layers to be heat sealed together with a superposed electrically conducting filament into the space between said members, a pair of electrodes on one of said pressure members adapted when pressed by said reciprocating means against said filament to interpose a length thereof into an electric circuit thereby to heat such length and the region of said layers in contact therewith to heat sealing temperatures, and an actuating mechanism for said reciprocating means and for said feeding means to progressively advance further lengths of said layers and of said filament into cooperating relation with said pressure members and with said electrodes and to apply pressure on such length coincidentally with their heating to heat sealing temperature.

3. A machine for heat sealing layers of thermoplastic material comprising, in combination, a first pressure member having a pressure surface with two spaced electrodes therein, a second pressure member mounted for cooperation therewith, means for reciprocating said members, means for progressively advancing the layers to be heat sealed together with an electrically conducting filament through the space between said members so that upon the application of pressure to said members a region of said layers is compressed and a corresponding length of said filament is electrically connected to said electrodes, an energizing circuit including a switch for said electrodes adapted when actuated to pass heating current through said length of filament, and an actuating mechanism for operating said reciprocating means, said advancing means and said switch in such predetermined sequence as to progressively compress further lengths of said layers and of said filament while heating such length to heat sealing temperature by passing current through the filament.

4. A machine for heat sealing plies of thermoplastic material comprising, in combination, a first pressure member having a pressure face with two spaced electrodes therein, a second pressure member mounted for cooperation therewith, means for reciprocating said members with respect to each other thereby to apply pressure upon a pair of plies of thermoplastic material and a superposed unit length of conducting filament interposed therebetween and to electrically connect the ends of said filament to said electrodes, a switching mechanism operable in the pressure-applying position of said members to interpose said electrodes and said unit length of filament into an electrical circuit for a predetermined period thereby to cause heating of said length of filament and bonding of the underlying plies with each other and with said length of filament, feeding means operable after the end of said period for discontinuously advancing further lengths of the plies and of the filament into pressure-applying relation with said members, and an operating mechanism for actuating said reciprocating means, said switching mechanism and said feeding means in such predetermined sequence that the period of pressure application upon said plies extends beyond the period of heat application to such plies.

5. A machine for heat sealing plies of thermoplastic material comprising, in combination, a pair of cooperating pressure rolls, a plurality of electrodes uniformly spaced around the circumferential surface of one of said rolls, successive electrodes of said plurality being alternately connected to a pair of terminals, means for feeding a pair of plies of thermoplastic material with an electrically conducting filament superposed thereon into the bight of said rolls to have a unit length of the said filament in pressure contact with a pair of adjacent electrodes, means for driving said rolls, and a switching mechanism operable concurrently with the operation of said driving means to connect said electrode terminals to a source of current for a predetermined period each time when a unit length of said filament is advanced into pressure applying position in the bight of said rolls.

6. A machine for bonding plies of thermoplastic sheet material which comprises, in combination, a bonding roll having a plurality of electrodes uniformly spaced around the circumferential surface thereof, successive electrodes of said plurality being alternately connected to a pair of electrodes, respectively, a pressure roll mounted for cooperation with said bonding roll, means for continuously feeding a pair of plies of thermoplastic sheet material with an electrically conducting filament superposed thereon into the bight of said rolls to have at all times a unit length of said filament in pressure contact with a pair of adjacent electrodes, means for continuously driving said rolls in opposite directions, and switching means operable synchronously with the rotation of said bonding rolls to connect said electrode terminals to a source of current for a predetermined period each time a unit length of said filament is advanced into pressure-applying position in the bight of the rolls thereby causing heating of said length of filament and bonding of the underlying linear region of the plies.

References Cited in the file of this patent

UNITED STATES PATENTS

| | | |
|---|---|---|
| 1,437,870 | Swinehart | Dec. 5, 1922 |
| 1,560,712 | Naylor | Nov. 10, 1925 |
| 1,825,308 | Dorogi et al. | Sept. 29, 1931 |
| 2,054,354 | Alderfer | Sept. 15, 1936 |
| 2,525,356 | Hoyler | Oct. 10, 1950 |
| 2,574,094 | Fener et al. | Nov. 6, 1951 |
| 2,589,777 | Collins | Mar. 18, 1952 |
| 2,621,704 | Langer | Dec. 16, 1952 |
| 2,627,893 | Williams | Feb. 10, 1953 |
| 2,640,798 | Langer | June 2, 1953 |